United States Patent Office 3,824,241
Patented July 16, 1974

3,824,241
PYRIDINESULFONIC ACIDS
Renat Herbert Mizzoni, Long Valley, N.J., and Herbert Morton Blatter, Basalt, Colo., assignors to Ciba-Geigy Corporation, Ardsley, N.Y.
No Drawing. Continuation-in-part of application Ser. No. 67,205, Aug. 26, 1970, which is a continuation-in-part of application Ser. No. 20,833, Mar. 18, 1970, now Patent No. 3,674,794, dated July 4, 1972, which in turn is a continuation-in-part of abandoned application Ser. No. 876,038, Nov. 12, 1969. This application June 30, 1972, Ser. No. 267,775
Int. Cl. A61k 27/00; C07d 31/48
U.S. Cl. 260—294.8 R
3 Claims

ABSTRACT OF THE DISCLOSURE

New 4-arylamino-3-pyridinesulfonic acids, e.g. those of the formula

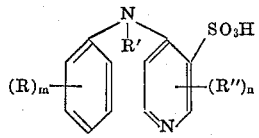

R=H, alkyl, alkanoyl, free, esterified or etherified OH or SH, $CF_3$, $NO_2$, an amino, free or functionally converted carboxy or sulfo
R'=H, alkyl or acyl
R''=H or alkyl
m=1–5
n=1 or 2 the N-oxide, esters or salts thereof are diuretic agents.

CROSS-REFERENCES TO RELATED APPLICATIONS

This is a continuation-in-part of application Ser. No. 67,205, filed Aug. 26, 1970, which in turn is a continuation-in-part of application Ser. No. 20,833, filed Mar. 18, 1970 (now Pat. No. 3,674,794, issued July 4, 1972), which in turn is a continuation-in-part of application Ser. No. 876,038, filed Nov. 12, 1969 (now abandoned).

SUMMARY OF THE INVENTION

The present invention concerns and has for its object the provision of new 4-arylamino-3-pyridinesulfonic acids and pharmaceutically useful acid or amino derivatives thereof, preferably of those corresponding to Formula I,

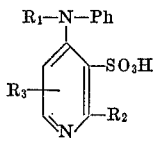

wherein Ph is an unsubstituted or up to penta-substituted phenyl radical, $R_1$ is hydrogen, lower alkyl or an acyl radical and each of $R_2$ and $R_3$ is hydrogen or lower alkyl, the N-oxide or pharmaceutically useful esters or salts thereof, as well as of corresponding pharmaceutical compositions and of methods for the preparation and application of these products, which are primarily useful as orally applicable diuretic, sodi- and chloriuretic agents, in order to relieve excessive water and/or salt retention, for example, in connection with heart or kidney diseases and in the adjunctive management of hypertension.

DESCRIPTION OF THE PREFERRED EMBODIMENTS

In the above Formula I, the phenyl radical Ph is un- substituted or substituted by one or more than one, preferably by up to three, advantageously one or two, of the same or of different substituents selected from the group consisting of lower alkyl, e.g. methyl, ethyl, n- or i-propyl or butyl; lower alkanoyl, e.g. acetyl or propionyl, free, etherified or esterified hydroxy or mercapto, such as lower alkoxy, aryloxy or lower alkylmercapto, e.g. methoxy, ethoxy, n- or i-propoxy or butoxy; phenoxy or toluyloxy; methylmercapto or ethylmercapto; lower alkanoyloxy, e.g. acetoxy or propionyloxy; halogeno, e.g. fluoro, chloro, or bromo; trifluoromethyl, nitro, amino, mono- or di-lower alkylamino, lower alkyleneimino or lower alkanoylamino, e.g. mono- or dimethylamino or -ethylamino; pyrrolidino or piperidino, acetaylamino or propionylamino; free, esterified or amidated carboxy or sulfo, e.g. lower carbalkoxy or alkoxysulfonyl, carbamoyl, sulfamoyl, mono- or di-lower alkylcarbamoyl or -sulfamoyl, e.g. carbomethoxy, carbethoxy, methoxysulfonyl, mono- or dimethylcarbamoyl or -sulfamoyl. The term "lower," referred to above and hereinafter in connection with organic radicals or compounds respectively, defines such with up to 7, preferably up to 4, carbon atoms.

Preferred Ph radicals are phenyl, mono- or di-(lower alkyl - phenyl, (lower alkanoyl)-phenyl, (hydroxy)-phenyl, mono-, di- or tri-(lower alkoxy)-phenyl, (phenoxy)-phenyl, (mercapto)-phenyl, (lower alkylmercapto)-phenyl, mono- to penta-(halo)-phenyl, mono- or di-(amino)-phenyl, (lower alkanoylamino)-phenyl, (di-lower alkylamino) - phenyl, (carboxy)-phenyl, (lower carbalkoxy)-phenyl, (sulfo)-phenyl, (sulfamoyl)-phenyl, (lower alkyl, hydroxy, mono- or di-lower alkoxy, phenoxy, trifluoromethyl, nitro, mono- or diamino or di-lower alkylamino)-halophenyl, (phenoxy or trifluoromethyl)-lower alkoxyphenyl, (di-lower alkylamino)-trifluoromethylphenyl or (hydroxy, lower alkoxy or amino)-di-halophenyl.

The alkyl radicals $R_1$, $R_2$ and $R_3$ are preferably such with up to 4 carbon atoms, e.g. those mentioned above, especially methyl.

An acyl radical $R_1$ is preferably lower alkanoyl or alkenoyl, e.g. acetyl, propionyl, pivaloyl, acryloyl or methacryloyl, or Ph-lower alkanoyl or -alkenoyl, e.g. benzoyl, phenylacetyl or cinnamoyl.

Esters of the acids of Formula I are preferably lower alkyl or (hydroxy, lower alkoxy, amino or Ph)-lower alkyl esters, e.g. the methyl, ethyl, n- or i-propyl, 2-(hydroxy, methoxy, amino or dimethylamino)-ethyl or benzyl esters.

Salts of said acids are preferably those of therapeutically useful inorganic or organic bases, primarily the alkali metal, alkaline earth metal, e.g. sodium, potassium, magnesium or calcium salts, or ammonium salts from ammonia or amines, such as those of mono-, di- or tri-lower alkylamines, or tertiary nitrogen bases, such as pyridine, collidine or lutidine. Resulting compounds that contain basic groups, e.g. amino groups, may also form acid addition salts preferably such of therapeutically useful inorganic or organic acids, such as strong metalloidic acids, for example hydrohalic, e.g. hydrochloric or hydrobromic acid, sulfuric, phosphoric, nitric or perchloric acid; aliphatic or aromatic carboxylic or sulfonic acids, e.g., formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic toluenesulfonic, naphthalenesulfonic or sulfanilic acid; methionine, tryptophane, lysine or arginine.

The compounds of the invention exhibit valuable pharmacological properties. Besides anti-inflammatory effects, they primarily show diuretic, natri- and chloriuretic activity with rapid onset of action, high urine but low potassium excretion levels. This can be demonstrated in animal tests using, for example mammals, e.g. rats or dogs, as test objects. The compounds of the invention can be administered enterally or parenterally, for example orally within a gelatin capsule to dogs, or in the form of aqueous solutions or suspensions by stomach tube to rats. The oral dosage may range between about 0.1 and 50 mg./kg./day, preferably between about 0.3 and 10 mg./kg./day, advantageously between about 1 and 5 mg./kg./day. Simultaneously the test animals may receive various salt loads enterally or parenterally, for example, various amounts of subscutaneously applied 0.9% saline, e.g. 100 ml. thereof per medium-sized dog (beagle). Thus, the compounds of the invention cause an increase in the excretion of urine, which is collected, e.g. at 2 hour intervals, with or without catheterization, and its volume, sodium, potassium and chloride content estimated and compared with that of the same untreated or saline-treated animals. Said compounds also cause in the rat paw edema test [Winter et al., Proc. Soc. Exp. Biol. Med., 111, 544 (1962)] a slight reduction of the paw edma induced by carrageenin. Accordingly, the compounds of the invention are mild antiphlogistics and potent diuretics, sodi- and chloriuretics, primarily useful in the treatment or management of edematous water and salt retention, usually in connection with heart and kidney diseases or hypertension. They can also be used as intermediates in the preparation of other valuable products, primarily of pharmacologically active compounds.

Particularly useful are those compounds of Formula I in which Ph is phenyl or phenyl substituted by up to three of the same or different substituents selected from the group consisting of lower alkyl, lower alkanoyl, hydroxy, mercapto, lower alkoxy, phenoxy, lower alkylmercapto, lower alkanoyloxy, halogeno, trifluoromethyl, nitro, amino, mono- or di-lower alkylamino, lower alkyleneimino, lower alkanoylamino, carboxy, sulfo, lower carbalkoxy, lower alkoxysulfonyl, carbamoyl, sulfamoyl, mono- or di-lower alkylcarbamoyl, mono- or di-lower alkylsulfamoyl, $R_1$ is hydrogen, lower alkyl, lower akanoyl, lower akenoyl, Ph-lower alkanoyl or Ph-lower alkenoyl, and each of $R_2$ and $R_3$ is hydrogen or lower alkyl, or the N-oxide, a lower alkyl or (hydroxy, lower alkoxy, amino or Ph)-lower alkyl ester, an alkali metal, alkaline earth metal or ammonium salt, or a therapeutically useful acid addition salt thereof.

Preferred are those compounds of Formula I in which Ph is phenyl, mono- or di-(lower alkyl)-phenyl, (lower alkanoyl)-phenyl (hydroxy)-phenyl, mono-, di- or tri-(lower alkoxy)-phenyl, (phenoxy)-phenyl, (mercapto)-phenyl, (lower alkylmercapto)-phenyl, mono- to penta-(halogeno)-phenyl, mono- or bis-(trifluoromethyl)-phenyl, (nitro)-phenyl, mono- or di-(amino)-phenyl, (lower alkanoyl-amino)-phenyl, (di-lower alkylamino)-phenyl, (carboxy)-phenyl, (lower carbalkoxy)-phenyl, (sulfo)-phenyl, (sulfamoyl)-phenyl, (lower alkyl, hydroxy, mono- or di-lower alkoxy, phenoxy, trifluoromethyl, nitro, mono- or diamino or di-lower alkylamino)-halophenyl, (phenoxy or trifluoromethyl)-lower alkoxyphenyl, (di-lower alkylamino)-trifluoromethylphenyl or (hydroxy, lower alkoxy or amino)-di-halophenyl, $R_1$ is hydrogen, lower alkyl or alkanoyl and each of $R_2$ and $R_3$ is hydrogen or lower alkyl, or the lower alkyl esters, ammonium, alkali or alkaline earth metal salts thereof.

Especially valuable are the compounds of Formula I in which Ph is phenyl, mono- or dimethylphenyl, hydroxyphenyl, mono-, di- or trimethoxyphenyl, mono- or difluorophenyl, mono- or dichlorophenyl, bromophenyl, (methyl, hydroxy, methoxy or trifluoromethyl)-chlorophenyl, mono- or bis-trifluoromethylphenyl, dimethylaminophenyl, carboxyphenyl, carbethoxyphenyl or sulfamoylphenyl and each of $R_1$, $R_2$ and $R_3$ is hydrogen or methyl, or the sodium or potassium salt thereof.

Outstanding are the compounds of Formula I in which Ph is phenyl, fluorophenyl, chlorophenyl, bromophenyl or trifluoromethylphenyl and each of $R_1$, $R_2$ and $R_3$ is hydrogen, or the sodium or potassium salt thereof.

The compounds of the invention are either prepared according to known methods or, more advantageously, according to a new method which is also a part of the present invention. For example, they are obtained by converting in a compound of the Formula II

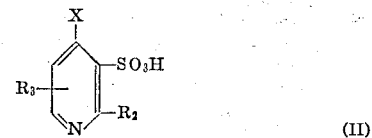

in which X is a group capable of being converted into the amino group $R_1$—N—Ph, or in a functional derivative thereof, X into said amino group and converting any resulting functional acid derivative different from those defined above, into the free acid, its esters or salts and, if desired, converting any resulting compound into another compound of the invention.

The group X is, for example, a free or preferably reactively etherified or esterified hydroxy group, such as lower alkoxy, lower alkanoyloxy or halogeno, e.g. such mentioned above, advantageously methoxy or chlorine, or above all a nitro group. Functional derivatives of the acid of Formula II are, for example the above-mentioned esters or the unsubstituted or N-alkylated amides or hydrazides.

The above-mentioned starting material, especially when X is a nitro group constituting the novel feature of the present process, is advantageously reacted with the amine $R_4$—NH—Ph, wherein $R_4$ is hydrogen or lower alkyl, preferably in the absence, but also in the presence of diluents, advantageously of those which are inert to the reagents and are solvents thereof, of catalysts, condensing agents and/or inert atmospheres, at low temperatures, room temperature or elevated temperatures, for example, between about 0 and 150°, or preferably between about 20 and 130°, at atmospheric pressure.

In the above reaction the amine reagent is advantageously used in excess, at least 100%, in order to neutralize any generated acid. It may, however, also be used in equivalent amounts and in the presence of other condensing agents such as inorganic or organic bases, e.g. alkali metal carbonates or bicarbonates or tertiary nitrogen bases, for example tri-lower alkylamines, N,N-dimethyl-aniline or pyridine.

Any resulting amide or hydrazine can be hydrolyzed in the usual manner, for example, with the use of a base, e.g. an aqueous alkali or alkaline earth metal hydroxide, or a quaternary ammonium hydroxide. The compounds of the invention so obtained may be converted into each other according to known methods. For example, resulting compounds of Formula I, wherein Ph is nitro- or halo-phenyl, can be hydrogenated in the presence of the usual catalysts, e.g. palladium or platinum catalysts, to obtain the corresponding aminophenyl or deshalogenated compounds. Furthermore etherified hydroxy- or mercaptophenyl compounds may be hydrolyzed with strong inorganic acids, e.g. hydrobromic acid, in order to obtain the corresponding free phenolic compounds. Those in which $R_1$ stands for hydrogen, may be reacted with a reactive ester of a corresponding alcohol, for example that of a hydrohalic or sulfonic acid, such as a halide or anhydride thereof, e.g. acetyl chloride or acetic anhydride. Resulting acyl derivatives or esters may be hydrolyzed, for example with the use of acidic or alkaline hydrolyzing agents, esters transesterified or resulting acids esterified in known manner, i.e. either directly with the use of lower alkanols and acidic catalysts, or indirectly via the acid halides, which latter can be prepared with the use of thionyl or phosphorus halides, e.g. thionyl chloride or phosphorus pentachloride. Resulting acids can also be salified in the usual manner, i.e. by reaction with corresponding inorganic or organic bases or salts, e.g. alkali metal or alkaline earth metal hydroxides, carbonates, bicarbonates or lower alkanoates, ammonia, amines or corresponding ion exchange preparations. Resulting bases may also be converted into acid addition salts by reacting them with the corresponding free acids or acidic ion exchange preparations.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such as possible or appropriate under the circumstances. Resulting mixtures of isomers can be separated into the single isomers by methods in themselves known, e.g. by fractional distillation, crystallization and/or chromatography.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly those starting materials should be used in the reactions of the invention that lead to the formation of those compounds indicated above as being especially valuable.

The starting material is known or, if new, may be prepared according to methods illustrated in the examples herein. Compounds of Formula II, wherein X is nitro, as well as the unsubstituted or N-alkylated amides or hydrazides of the acids of Formula I, are new and are considered as additional subject matter of the present invention. The former are prepared from the corresponding 4-aminopyridine-3-sulfonic acids or their functional derivatives, by oxidation, preferably with the use of peroxides, such as hydrogen peroxide or advantageously persulfuric acid, which latter can be generated *in situ* from sulfuric acid and hydrogen peroxide. Said new sulfonamides or hydrazides exhibit also valuable pharmacological properties, for example antiinflammatory effects. They are obtained according to the process described above, i.e. by choosing the appropriate amides or hydrazides derived from the acids of Formula II.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous istonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples illustrating the invention are not to be construed as being limitations thereon. Temperatures are given in degrees Centigrade and all parts wherever given are parts by weight.

EXAMPLE 1

5 g. 4-nitro-3-pyridinesulfonic acid are added portionwise to 50 ml. 3-chloroaniline while stirring and cooling, to keep the temperature below 55°. The mixture is stirred for 3 hours at 100° under nitrogen, cooled and diluted with diethyl ether. The precipitate formed is filtered off, washed with diethyl ether and suspended in water. The suspension is neutralized with aqueous sodium hydroxide, filtered, the filtrate evaporated *in vacuo* and the residue recrystallized from water, to yield the sodium 4-(3-chlorophenylamino)-3-pyridinesulfonate of the formula

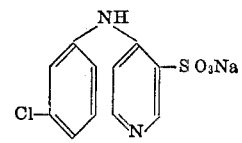

melting above 300° and showing in the thin-layer chromatogram on silica gel using chloroform-methanol-diethylamine (8:2:1) as mobile phase an $R_{cm}=7.5$ (developed with platinum tetrachloride and estimated in U.V. light).

In the analogous manner, the sodium 4-(2-chlorophenylamino) - 3 - pyridinesulfonate is obtained from equal amounts of the corresponding starting materials; $R_{cm}=6.0$ (same eluent).

EXAMPLE 2

6 g. 4-nitro-3-pyridinesulfonic acid are added portionwise to 50 ml. 3-trifluoromethylaniline while stirring and cooling, to keep the temperature below 55°. The mixture is stirred for 3 hours at 100° under nitrogen, cooled and diluted with diethyl ether. The precipitate formed is filtered off and recrystallized from ethanol, to yield the 4-(3-trifluoromethylphenylamino) - 3 - pyridinesulfonic acid of the formula

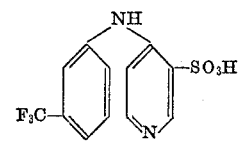

melting at 269–270° with decomposition.

1 g. thereof is taken up in the minimum amount of aqueous potassium carbonate, the solution washed with diethyl ether, evaporated *in vacuo* and the residue recrystallized from water, to yield the corresponding potassium salt showing in the thin-layer chromatogram on silica gel, using chloroform - methanol - diethylamine (7:2:1), an $R_{cm}=7.0$.

EXAMPLE 3

7 g. 4-nitro-3-pyridinesulfonic acid are added portionwise to 70 ml. 2-chloro-5-trifluoromethylaniline while stirring and cooling. The mixture is stirred under nitrogen at 120° for 4 hours, cooled and diluted with diethyl ether. The precipitate formed is filtered off and recrystallized from methanol, to yield the 4-(2-chloro-5-trifluoromethylphenylamino)-3-pyridinesulfonic acid of the formula

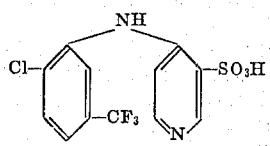

showing on silica gel in chloroform-methanol-diethylamine (8:2:1) an $R_{cm}=8.0$.

EXAMPLE 4

4 g. 4-nitro-3-pyridinesulfonic acid are added to 20 g. 4-chloro - 2 - trifluoromethyl-aniline portionwise and the mixture stirred for 3½ hours at 130–140° under nitrogen. It is cooled, diluted with diethyl ether, the precipitate formed filtered off and recrystallized from methanol, to yield the 4-(4-chloro - 2 - trifluoromethylphenylamino)-3-pyridinesulfonic acid of the formula

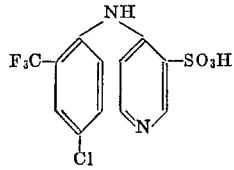

showing on silica gel in chloroform-methanol-diethylamine (8:2:1) an R=9.0.

The starting material used in this and the previous examples is prepared as follows: To 216 ml. 30% aqueous hydrogen peroxide, 432 ml. concentrated sulfuric acid are added at −5 to 0° while stirring. After ½ hour, the solution of 60 g. 4-amino-3-pyridinesulfonic acid in 300 ml. concentrated sulfuric acid are added dropwise while stirring at −5 to +5°. After stirring for 2 hours at 0°, the mixture is allowed to stand in a large water bath at room temperature for 16 hours. It is poured onto 3 kg. ice, filtered and the residue washed with water and isopropanol, to yield the 4-nitro-3-pyridinesulfonic acid melting at 255–255.5° with decomposition.

EXAMPLE 5

The mixture of 5 g. 4-(3-trifluoromethylphenylamino)-3-(3-trifluoromethylphenylsulfamoyl) - pyridine and 100 ml. 20% hydrochloric acid is refluxed for 2 hours and slowly evaporated. The residue is washed with water and recrystallized from ethanol, to yield the 4-(3-trifluoromethylphenylamino)-3-pyridinesulfonic acid melting at 269–270° with decomposition; it is identical with that obtained according to Example 2.

The startng material is prepared as follows: The mixture of 175.1 g. 4-hydroxy-3-pyridinesulfonic acid, 468 g. phosphorus pentachloride and 100 ml. phosphorus oxychloride is refluxed for 6 hours while stirring under nitrogen. It is evaporated in vacuo, the residue poured onto ice and the mixture extracted with methylene chloride. The extract is washed with water, dried and evaporated. The residue is taken up in diethyl ether, the mixture filtered, the filtrate evaporated, the residue distilled and the fraction boiling at 120–122°/1 mm. Hg collected, to yield the 4-chloro-3-pyridinesulfonyl chloride.

11 g. thereof are added portionwise to 100 ml. 3-trifluoromethylaniline while cooling and the mixture stirred for 12 hours at 150° under nitrogen. It is cooled, filtered, the filtrate diluted with diethyl ether and the precipitate formed triturated with diethyl ether. It is taken up in isopropanol, reprecipitated with diethyl ether, recrystallized from 2-butanone-diethyl ether and chromatographed on silica gel using benzene-isopropanol (9:1) as the mobile phase. The slower moving fraction having $R_{cm}$=5.5 is isolated, to yield the 4-(3-trifluoromethylphenylamino)-3-(3-trifluoromethylphenylsulfamoyl)-pyridine.

EXAMPLE 6

The mixture of 5 g. 4-(3-trifluoromethylphenylamino)-3-pyridinesulfonamide and 100 ml. 20% hydrochloric acid is refluxed for 1 hour and slowly evaporated. The residue is washed with water and recrystallized from ethanol, to yield the 4-(3-trifluoromethylphenylamino)-3-pyridinesulfonic acid melting at 269–270° with decomposition; it is identical with the compound obtained according to Example 2.

The starting material is prepared as follows: The solution of 12 g. 4-chloro-3-pyridinesulfonyl chloride in the minimum amount of acetone is cooled to 5° and added dropwise to 20 ml. concentrated aqueous ammonia while stirring at 5–8°. After stirring for ½ hour at 0°, it is filtered, the residue washed with acetone and the filtrate again filtered after standing in the cold. The filtrate is evaporated in vacuo, the residue recrystallized from isopropanol and ethanol-diethyl ether, to yield the 4-chloro-3-pyridinesulfonamide.

The mixture of 4 g. thereof and 40 ml. 3-trifluoromethylaniline is stirred for 12 hours at 150° under nitrogen. After cooling, it is diluted with diethyl ether, the precipitate formed filtered off and recrystallized from isopropanol-diethyl ether, to yield the 4-(3-trifluoromethylphenylamino)-3-pyridinesulfonamide hydrochloride. It is taken up in water, the solution neutralized with 10% aqueous sodium bicarbonate and evaporated in vacuo, to yield the corresponding free base. The latter can be taken up in the minimum amount of ethanol, the solution neutralized with 2N sodium hydroxide, evaporated in vacuo and the residue recrystallized from ethanol, to yield the corresponding sodium salt having an $R_{cm}$=11.0 on silica gel using chloroform-methanol-formic acid (45:45:10) as the mobile phase.

EXAMPLE 7

To 60 ml. 3-chloroaniline, 15 g. 4-nitro-3-pyridinesulfonic acid are added during 45 minutes while stirring and cooling with ice. After stirring overnight at room temperature, the mixture is triturated several times with diethyl ethyl, the precipitate formed filtered off and washed with isopropanol and diethyl ether, to yield the 4-(3-chlorophenylamino)-3-pyridinesulfonic acid of the formula

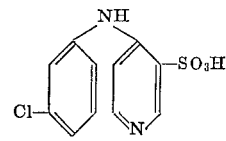

melting at 283–285°.

It is suspended in water, the suspension adjusted to pH=7.9 with 10% aqueous sodium carbonate, the solution washed with diethyl ether and evaporated in vacuo. The residue is triturated with hot methanol, the solution filtered off and the filtrate evaporated in vacuo, to yield the corresponding sodium salt which is identical with that obtained according to Example 1.

EXAMPLE 8

The mixture of 5-methyl-4-nitro-3-pyridinesulfonic acid and 50 ml. 3-trifluoromethylaniline is stirred for two hours at 110°. After cooling it is diluted with diethyl ether, filtered and the residue washed with diethyl ether, isopropanol and again diethyl ether, to yield the 5-methyl-4-(3-trifluoromethylphenylamino)-3-pyridinesulfonic acid of the formula

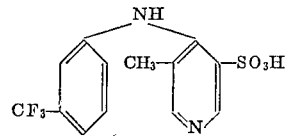

melting above 320°.

It is suspended in water, the pH of the suspension adjusted to 7.9 with 10% aqueous sodium carbonate, the resulting solution washed with diethyl ether and evaporated in vacuo. The residue is taken up in hot isopropanol, the solution filtered and the filtrate evaporated in vacuo, to yield the corresponding sodium salt melting at 319–320°.

The starting material is prepared as follows: To the mixture of 53.5 g. concentrated sulfuric acid and 13.4 g. fuming sulfuric acid (containing 20% sulfur trioxide), 25 g. 4-amino-3-picoline are added portionwise while stirring and keeping the temperature at 40–50°. The mixture is heated to 195° for 20 hours under nitrogen, cooled and triturated with diethyl ether until the washings become clear. The gummy residue is further triturated with isopropanol until crystalline, filtered off and washed with hot isopropanol and diethyl ether, to yield the 4-amino-5-methyl-3-pyridinesulfonic acid, showing in the thin-layer chromatogram on silica gel, using methanol-water (9:1) as mobile phase, an $R_{cm}=10.0$.

15 g. thereof are taken up in 75 ml. concentrated sulfuric acid and the solution added dropwise to the mixture of 114 ml. concentrated sulfuric acid and 57 ml. 30% aqueous hydrogen peroxide while stirring at −5 to +5°. The mixture is stirred for half hour at 0° and 24 hours at 20–25°. It is poured onto ice, the precipitate formed filtered off, washed with water, isopropanol and diethyl ether, to yield the 5-methyl-4-nitro-3-pyridinesulfonic acid melting at 268–269° with decomposition.

EXAMPLE 9

8.0 g. 4-nitro-3-pyridinesulfonic acid are added portionwise to 45 ml. ethyl 2-aminobenzoate while stirring under nitrogen, whereupon the mixture is heated to 80° for 2 hours. After cooling, it is diluted with diethyl ether, filtered, the residue washed with hot isopropanol and diethyl ether, to yield the 4-(2-carbethoxyphenylamino)-3-pyridinesulfonic acid.

The mixture of 10 g. thereof and 100 ml. concentrated hydrochloric acid is heated on the steam bath for 2 hours, the precipitate formed filtered off, suspended in water and the pH of the suspension adjusted to 8.1 with 10% aqueous sodium carbonate. It is evaporated *in vacuo*, the residue taken up in methanol, the solution filtered and concentrated, to yield the disodium 4-(2-carboxyphenylamino)-3-pyridinesulfonate of the formula

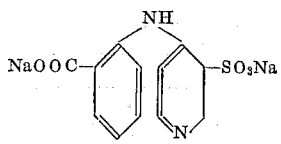

showing on silica gel in chloroform-methanol-formic acid (7:2:1) an $R_{cm}=4.0$.

EXAMPLE 10

5 g. 4-nitro-3-pyridinesulfonic acid are added portionwise to 20 ml. 3-methylthioaniline while stirring and cooling, to keep the temperature below 30°. The mixture is stirred for 2 hours at room temperature and diluted with diethyl ether. The precipitate formed is collected on a filter and recrystallized from methanol-diethyl ether to afford the 4-(2-methylthiophenylamino)-3-pyridinesulfonic acid of the formula

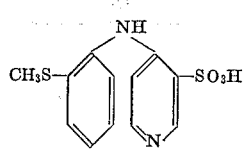

melting at 215–217°.

1 g. thereof is treated with the solution of 0.6 g. of sodium 2-ethyl-hexanoate in 10 ml. of ethanol. The solvent is removed *in vacuo* and the resulting solid triturated with 2-propanol. The solid is filtered, washed with 2-propanol and diethyl ether and dried to yield the corresponding sodium salt having an $R_{cm}=7.0$ on silica gel using chloroform-methanol-formic acid (9:1:1) as the mobile phase.

EXAMPLE 11

The mixture of 3.8 g. of 4-nitro-3-pyridinesulfonic acid, 5.52 g. of 3-nitroaniline and 200 ml. of ethanol is refluxed for 48 hours, cooled, filtered and the residue washed with ethanol-diethyl ether. It is taken up in the minimum amount of methanol and the solution combined with one equivalent of methanolic sodium 2-ethylhexanoate. The mixture is evaporated, the residue triturated with hot isopropanol, filtered and the residue washed with isopropanol and diethyl ether, to yield the sodium 4-(3-nitro-phenylamino)-3-pyridinesulfonate of the formula

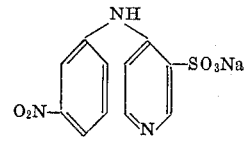

showing on silica gel in ethyl acetate-methanol-conc. aqueous ammonia (17:3:3) an $R_{cm}=4.0$.

In the analogous manner the sodium 4-(2- or 4-nitrophenylamino)-3-pyridinesulfonates, as well as the sodium 4-(2-nitro-4-chlorophenylamino)-, or the 4-(4-nitro-3-chlorophenylamino), or the 4-(2-amino-3-nitro-5-chlorophenylamino)-3-pyridine-sulfonates are prepared.

EXAMPLE 12

The solution of 5.3 g. of sodium 4-(3-nitrophenylamino)-3-pyridinesulfonate in the minimum amount of water is hydrogenated over 0.4 g. of 10% palladium on charcoal at atmospheric pressure until the hydrogen uptake ceases. The mixture is filtered, the filtrate evaporated under reduced pressure, the residue triturated with hot isopropanol and filtered, to yield the sodium 4-(3-aminophenylamino)-3-pyridinesulfonate of the formula

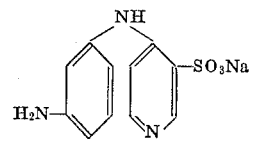

melting at 333°.

In the analogous manner the sodium 4-(2- or 4-amino-, the 4-amino-3-chloro-, or the 2-amino-4-chlorophenylamino)-3-pyridinesulfates are prepared, showing on silica gel in ethyl acetate-methanol-conc. aqueous ammonia (17:3:3) an $R_{cm}=2.5$ or 3.5 and an UV $\lambda_{max}=234$ and 285 respectively.

EXAMPLE 13

The mixtures of 5 g. of sodium 4-(2-amino-3-nitro-5-chlorophenylamino)-3-pyridinesulfonate, 150 ml. of water and 0.5 g. of 5% platinum on charcoal is hydrogenated at. 3 at. until the theoretical amount of hydrogen has been absorbed. It is filtered, the filtrate evaporated under reduced pressure, the residue taken up in isopropanol and the solution again evaporated, to yield the sodium 4-(2,3-diamino-5-chlorophenylamino)-3-pyridinesulfonate of the formula

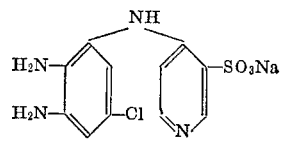

showing on silica gel in ethyl acetate-methanol conc. aqueous ammonia (17:3:) an $R_{cm}=4.5$.

EXAMPLE 14

The mixture of 5 g. of sodium 4-(2-nitro-4-chlorophenylamino)-3-pyridinesulfonate, 100 ml. of methanol, 25 ml. of water and 0.5 g. of 10% palladium on charcoal is hydrogenated at 3 at. until the hydrogen uptake ceases. It is filtered, the filtrate evaporated under reduced pressure and the residue triturated with hot isopropanol, to yield the sodium 4-(2-aminophenylamino)-3-pyridinesulfonate of the formula

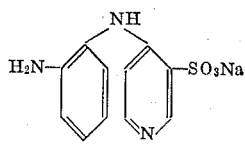

showing on silica gel in ethyl acetate-methanol-conc. aqueous ammonia (17:3:3) an $R_{cm}=4.0$.

EXAMPLE 15

The mixture of 10 g. of 4-(2-methoxy-4-chlorophenylamino)-3-pyridinesulfonic acid and 100 ml. of 48% aqueous hydrobromic acid is stirred at the steam bath for 10 hours and evaporated under reduced pressure. The residue is taken up in isopropanol, the solution evaporated, the residue taken up in the minimum amount of methanol and combined with one equivalent of methanolic sodium 2-ethylhexanoate, the mixture evaporated and the residue triturated with hot isopropanol, to yield the sodium 4-(2-hydroxy-4-chlorophenylamino)-3-pyridinesulfonate of the formula

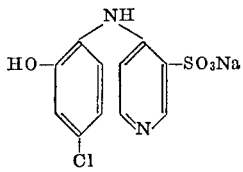

showing on silica gel in ethyl acetate-methanol-conc. aqueous ammonia (17:3:3) an $R_{cm}=2.0$. In the analogous manner the sodium 4-(4-hydroxy-3-chlorophenylamino)-3-pyridinesulfonate is obtained having $R_{cm}=1.0$ in the same system.

EXAMPLE 16

To the solution of 3.6 g. of 4-nitro-3-pyridinesulfonic acid in 100 ml. of hot water, 8 g. of 3-aminobenzenesulfonic acid are added and the mixture refluxed for 8 hours while stirring. It is evaporated, the residue taken up in isopropanol and again evaporated. The residue is triturated with hot methanol, filtered and the filtrate combined with one equivalent of methanolic sodium 2-ethylhexanoate. The mixture is evaporated and the residue triturated with hot isopropanol, to yield the monosodium 4-(3-sulfonylphenylamino)-3-pyridinesulfonate of the formula

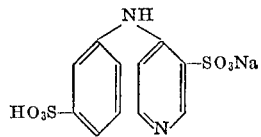

melting at 310–311°.

EXAMPLE 17

The mixture of 4.08 g. of 4-nitro-3-pyridinesulfonic acid, 10 g. of pentafluoroaniline and 10 ml. of ethanol is refluxed while stirring. It is cooled, diluted with diethyl ether, filtered, the filtrate washed with water, dried and evaporated. The residue is taken up in the minimum amount of methanol, the solution combined with one equivalent of methanolic sodium 2-ethylhexanoate, the mixture evaporated, the residue triturated with hot isopropanol and washed with diethyl ether, to yield the sodium 4-(pentafluorophenylamino)-3-pyridinesulfonate of the formula

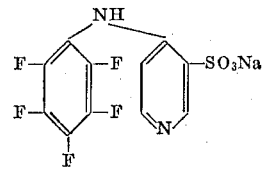

showing on silica gel in chloroform-methanol-formic acid (7:2:1) an $R_{cm}=5.0$.

EXAMPLE 18

According to the method illustrated by the previous examples, the following compounds of Formula I are prepared from equivalent amounts of the respective starting materials:

$R_2=H$, $Ph=R-C_6H_4$.

| Number | R | $R_1$ | $R_3$ | Salt | M.P. ° C. | $R_{cm}^1$ | $nH_2O$ |
|---|---|---|---|---|---|---|---|
| 1 | H | H | H | Na | | 12.8D | |
| 2 | 3-CH$_3$ | H | H | Na | | 12.5A | |
| 3 | 3-CH$_3$CO | H | H | Na | | 6.0C | |
| 4 | 4-CH$_3$CO | H | H | Na | | 4.5C | |
| 5 | 2-HO | H | H | Na | | 2.0E | |
| 6 | 2-HS | H | H | Na | | 3.5B | 1/2 |
| 7 | 2-CH$_3$O | H | H | Na | [2] 282–283 | | |
| 8 | 3-CH$_3$O | H | H | Na | | 11.5A | 1/2 |
| 9 | 2-C$_6$H$_5$O | H | H | Na | 246–247 | | |
| 10 | 3-C$_6$H$_5$O | H | H | Na | | [3] (14570) | 1/2 |
| 11 | 2-F | H | H | Na | | 6.5A | 1/2 |
| 12 | 3-F | H | H | Na | | 6.5A | 1 |
| 13 | 4-F | H | H | Na | | 6.5A | 1/2 |
| 14 | 3-Cl | CH$_3$ | H | Na | 302–306 | | |
| 15 | 3-Cl | H | 5-CH$_3$ | Na | | 3.5B | 1/2 |
| 16 | 4-Cl | H | H | Na | | 7.5C | |
| 17 | 3-Br | H | H | Na | | 12.5D | 1 |
| 18 | 2-CF$_3$ | H | H | Na | 305–307 | | 1/2 |
| 19 | 3-CF$_3$ | CH$_3$ | H | Na | 315–317 | | 1/2 |
| 20 | 2-NHCOCH$_3$ | H | H | Na | | 3.0E | |
| 21 | 3-COOH | H | H | 2Na | | 11.0D | 1/2 |
| 22 | 3-COOC$_2$H$_5$ | H | H | | 291–292 | | |
| 23 | 2-SO$_3$H | H | H | | | 5.0F | |
| 24 | 3-SO$_2$NH$_2$ | H | H | Na | 312–314 | | |
| 25 | 4-SO$_2$NH$_2$ | H | H | Na | | 2.5E | |

See footnotes at end of table.

$R_1=R_2=R_3=H$, $Ph=(R)_2-C_6H_3$

| Number | R | Salt | M.P. ° C. | $R_{cm}^1$ | $nH_2O$ |
|---|---|---|---|---|---|
| 26 | 4-CH$_3$-3-F | Na | | 5.0E | |
| 27 | 2-CH$_3$-3-Cl | Na | | 4.5V | |
| 28 | 2-HO-3-Cl | Na | | 2.0E | |
| 29 | 2-HO-5-Cl | Na | | 5.5C | |
| 30 | 2,4-(CH$_3$O)$_2$ | Na | [2] 265–267 | | |
| 31 | 3,4-(CH$_3$O)$_2$ | Na | [2] 315–317 | | |
| 32 | 2-CH$_3$O-4-C$_6$H$_5$O | Na | 272–274 | | |
| 33 | 2-CH$_3$O-3-Cl | Na | | 7.0C | |
| 34 | 2-CH$_3$O-4-Cl | Na | [2] 280–282 | | |
| 35 | 2-CH$_3$O-5-Cl | Na | 272 | 7.0C | |
| 36 | 4-CH$_3$O-3-Cl | Na | 309 | | |
| 37 | 2-C$_2$H$_5$O-4-Cl | Na | [1] 264 | | 1/2 |
| 38 | 2-n-C$_3$H$_7$O-4-Cl | Na | 273–274 | | 1/2 |
| 39 | 2-C$_6$H$_5$O-4-Cl | Na | 276 | | |
| 40 | 4-CH$_3$O-3-CF$_3$ | Na | [2] 330 | | 1 |
| 41 | 2,4-F$_2$ | Na | | 6.5A | 1 |
| 42 | 2,4-Cl$_2$ | Na | | 7.0C | |
| 43 | 3,5-Cl$_2$ | Na | | 12.0D | |
| 44 | 3-Cl-4-CF$_3$ | Na | | 4.5E | |
| 45 | 4-Cl-3-CF$_3$ | Na | | 7.0C | |
| 46 | 4-Cl-2-NH$_2$ | Na | 310 | | |
| 47 | 3-Cl-4-NH$_2$ | Na | | 3.5E | |
| 48 | 3-Cl-4-N(CH$_3$)$_2$ | Na | [2] 340–342 | | |
| 49 | 3,5-(CF$_3$)$_2$ | Na | | 7.5A | 1/2 |
| 50 | 3-CF$_3$-4-N(CH$_3$)$_2$ | Na | [2] 330 | | |

See footnotes at end of table.

TABLE—Continued $R_1=R_2=R_3=H$, $Ph=(R)_3-C_6H_2$

| Number | R | Salt | M.P. °C | $R_{cm}{}^1$ | $nH_2O$ |
|---|---|---|---|---|---|
| 51 | 2-HO-4,5-Cl$_2$ | Na | | 5.0C | 1/2 |
| 52 | 3,4,5-(CH$_3$O)$_3$ | Na | | 4.0E | |
| 53 | 2,4-(CH$_3$O)$_2$-5-Cl | Na | ²262 | | |
| 54 | 3,6-(CH$_3$O)$_2$-4-Cl | Na | 279 | | |
| 55 | 2-CH$_3$O-4,5-Cl$_2$ | Na | | 4.5E | |
| 56 | 2,4,5-Cl$_3$ | Na | | 6.5C | |
| 57 | 4,5-Cl$_2$-2-NH$_2$ | Na | 300 | | |

¹ All chromatograms on silica gel:
  A = chloroform-methanol-diethylamine (8:2:1)
  B = chloroform-methanol-forfic acid (9:1:1)
  C = chloroform-methanol-formic acid (7:2:1)
  D = methanol-water (9:1)
  E = ethyl acetate-methanol-conc. aqueous ammonia (17:3:3)
  F = benzene-methanol-diethylamine (6:3:1).
² Decomposition.
³ UVλ = 286 max.

EXAMPLE 19

Preparation of 10,000 tablets each containing 50.0 mg. of the active ingredient:

Formula

| | G. |
|---|---|
| Sodium 4-(3-chlorophenylamino)-3-pyridinesulfonate | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure

All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

In the analogous manner tablets are prepared, containing 10 to 100 mg., preferably 50 mg., of one of the other compounds illuustrated by the previous examples.

What is claimed is:

1. A 4-arylamino-3-pyridinesulfonic acid of the formula

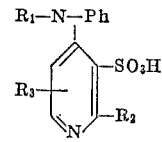

wherein Ph is phenyl, mono- or di(lower alkyl)-phenyl, (lower alkanoyl)-phenyl, (hydroxy)-phenyl, mono- or di- or tri-(lower alkoxy)-phenyl, (phenoxy)-phenyl, (mercapto)-phenyl, (lower alkylmercapto)-phenyl, mono- to penta-(halogeno)-phenyl, mono- or bis-(trifluoromethyl)-phenyl, (nitro)-phenyl, mono- or di-(amino)-phenyl, (lower alkanoylamino)-phenyl, (di-lower alkylamino)-phenyl, (carboxy)-phenyl, (lower carbalkoxy-phenyl, (sulfo)-phenyl, (sulfamoyl)-phenyl, (lower alkyl, hydroxy, mono- or di-lower alkoxy, phenoxy, trifluoromethyl, nitro, mono- or diamino or di-lower alkylamino)-halophenyl, (phenoxy or trifluoromethyl)-lower alkoxyphenyl, (di-lower alkylamino)-trifluoromethylphenyl or (hydroxy, lower alkoxy or amino)-di-halophenyl, $R_1$ is hydrogen, lower alkyl or lower alkanoyl and each of $R_2$ and $R_3$ is hydrogen or lower alkyl, or the N-oxide a lower alkyl ester, an ammonium, or therapeutically useful alkali or alkaline earth metal salt thereof.

2. A compound as claimed in claim 1, in which formula Ph is phenyl, mono- or dimethylphenyl, hydroxyphenyl, mono-, di- or trimethoxyphenyl, mono- or difluorophenyl, mono- or di-chlorophenyl, bromophenyl, (methyl, hydroxy, methoxy or trifluoromethyl)-chlorophenyl, mono- or bis-trifluoromethylphenyl, dimethylaminophenyl, carboxyphenyl, carbethoxyphenyl or sulfamoylphenyl and each of $R_1$, $R_2$ and $R_3$ is hydrogen or methyl, or the sodium or potassium salt thereof.

3. A compound as claimed in claim 1, in which formula Ph is phenyl, fluorophenyl, chlorophenyl, bromophenyl or trifluoromethylphenyl and each of $R_1$, $R_2$ and $R_3$ is hydrogen, or the sodium or potassium salt thereof.

References Cited

Koenigs et al.: C.A., 19:1276 (1924).

HENRY R. JILES, Primary Examiner

C. M. S. JAISLE, Assistant Examiner

U.S. Cl. X.R.

260—240 J, 293.69, 294.8 F; 424—263, 267